(12) United States Patent
Harada

(10) Patent No.: US 8,593,559 B2
(45) Date of Patent: Nov. 26, 2013

(54) REPRODUCING APPARATUS, IMAGE DATA REPRODUCING METHOD, PROGRAM, AND STORAGE MEDIUM

(71) Applicant: Canon Kabushiki Kaisha, Tokyo (JP)

(72) Inventor: Yasuhiro Harada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/793,312

(22) Filed: Mar. 11, 2013

(65) Prior Publication Data
US 2013/0215315 A1 Aug. 22, 2013

Related U.S. Application Data

(63) Continuation of application No. 13/403,309, filed on Feb. 23, 2012, now Pat. No. 8,441,569, which is a continuation of application No. 12/570,660, filed on Sep. 30, 2009, now Pat. No. 8,149,318, which is a continuation of application No. 10/778,825, filed on Feb. 13, 2004, now Pat. No. 7,616,247.

(30) Foreign Application Priority Data

Feb. 25, 2003 (JP) ................................. 2003-047959

(51) Int. Cl.
*H04N 5/222* (2006.01)

(52) U.S. Cl.
USPC ............ 348/333.12; 348/333.01; 348/333.05; 348/333.11

(58) Field of Classification Search
None
See application file for complete search history.

(56) References Cited

U.S. PATENT DOCUMENTS

2005/0174457 A1* 8/2005 Yoshino et al. .......... 348/333.01
2007/0268394 A1* 11/2007 Nonaka et al. ........... 348/333.12
2009/0284637 A1* 11/2009 Parulski et al. .......... 348/333.12

* cited by examiner

*Primary Examiner* — Lin Ye
*Assistant Examiner* — John H Morehead, III
(74) *Attorney, Agent, or Firm* — Cowan, Liebowitz & Latman, P.C.

(57) ABSTRACT

A reproducing apparatus, an image data reproducing method, a program, and a storage medium each detects an attitude state of the reproducing apparatus, extracts a part of an area of image data obtained by an image pickup device, and reproduces the part of the area of the extracted image data. According to the detection result, the part of the area of the image data is changed to another part of the area and rotation processing of another part of the area is performed, thereby reproducing the another part of the area which was subjected to the rotation processing.

8 Claims, 15 Drawing Sheets

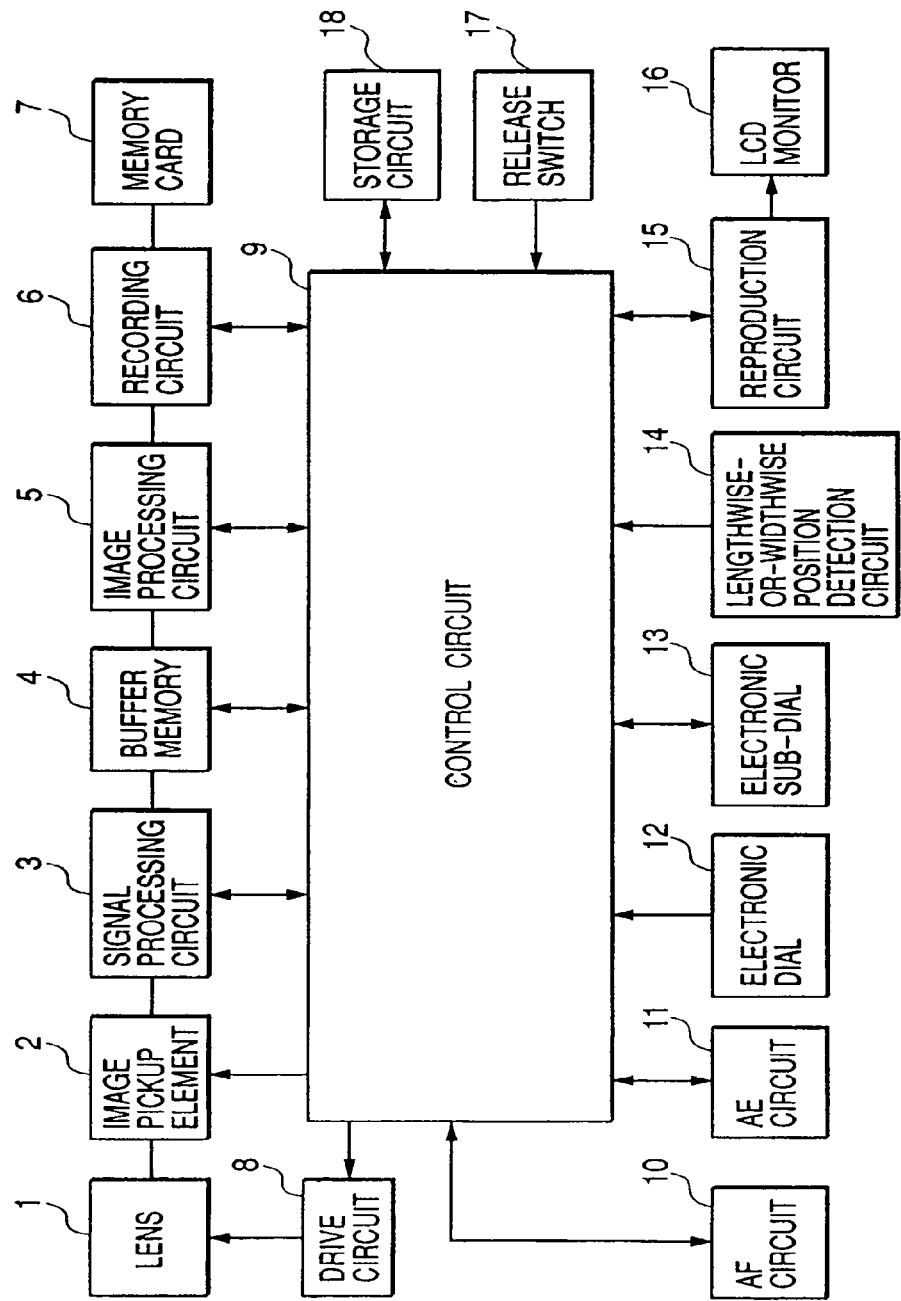

FIG. 8

| P1 | P2 | P3 |
|----|----|----|
| P4 | P5 | P6 |
| P7 | P8 | P9 |

REPRODUCING APPARATUS, IMAGE DATA REPRODUCING METHOD, PROGRAM, AND STORAGE MEDIUM

CROSS-REFERENCE TO RELATED APPLICATIONS

This application is a continuation of application Ser. No. 13/403,309, filed Feb. 23, 2012, which is a continuation of Ser. No. 12/570,660, filed Sep. 30, 2009, now U.S. Pat. No. 8,149,318; which is a continuation of application Ser. No. 10/778,825, filed Feb. 13, 2004, now U.S. Pat. No. 7,616,247, the entire disclosures of which are hereby incorporated by reference.

BACKGROUND OF THE INVENTION

1. Field of the Invention

The present invention relates to a reproducing apparatus, an image data reproducing method, a program, and a storage medium each for reproducing image data obtained by an image pickup device.

2. Related Background Art

There is known an image pickup device which uses an image pickup element to photograph an object incident from an optical system and performs signal processing of the resultant image signal to convert the image signal into image information. An electronic still camera is a device to which the image pickup device is applied. Various kinds of electronic still cameras, which is arranged to record the image information on a recording medium which is composes of a memory card including a flash memory or a hard disk drive, have been proposed.

In the electronic still cameras of this type, there has been also proposed the electronic still camera in which a monitor is built in a camera body so as to reproduce the photographed image on the spot and which can perform enlargement reproduction of a part of photographed image, specified by a user on the compact monitor so that user can view details of the photographed image even if the monitor has the small number of pixels.

Further, the electronic still camera in which an attitude of the camera during photographing is detected, an image photographed in a lengthwise position of the camera is displayed by rotating the photographed image by 90 degrees during reproduction, and the image is normally displayed when the camera is in a widthwise position has been proposed. These functions improve operating ease of a user with respect to the image confirmation after photographing.

However, in the above conventional technologies, when the image is changed during enlargement reproduction, a display direction of the image is changed in accordance with a change in attitude information, but the change in the attitude information is not considered in an enlargement area reproduced at all. Accordingly, in case that the attitude is changed from the photographed image in the widthwise position to the photographed image in the lengthwise position when the image is changed during the enlargement reproduction, the same area, i.e. the widthwise position in this case is selected irrespective of the change in the attitude in the reproduction area where the enlargement reproduction is performed, so that the confirmation of the photographed image becomes very unnatural. The conventional technology in which the image is simply rotated according to the attitude during photographing can not provide the function with sufficient ease of use to users.

SUMMARY OF THE INVENTION

In view of the foregoing, it is an object of the invention to provide the reproducing apparatus, the image data reproducing method, the program, and the storage medium each of which improves convenience during reproducing the image data by performing reproduction processing according to the attitude state of the reproducing apparatus.

In order to achieve the above object, one aspect of the invention provides a reproducing apparatus comprising: an image processing device which extracts a part of an area of image data obtained by an image pickup device; a reproducing device which reproduces the part of the area of the image data extracted by the image processing device; and an attitude detection device which detects an attitude state of the reproducing apparatus, wherein according to detection result of the attitude detection device, the image processing device changes the part of the area of the image data to another part of the area and performs rotation processing of the another part of the area, and wherein the reproducing device reproduces the another part of the area, which was subjected to the rotation processing.

It is another object of the invention to provide a reproducing apparatus, an image data reproducing method, a program, and a storage medium each of which improves the convenience during reproducing the image data by performing the reproduction processing according to the attitude state of the image pickup device.

In order to achieve the above object, another aspect of the invention provides a reproducing apparatus comprising: an input device which inputs image data obtained by an image pickup device and an attitude state of the image pickup device; an image processing device which extracts a part of an area of the image data; and a reproducing device which reproduces the part of the area of the image data extracted by the image processing device, wherein according to the attitude state, the image processing device changes the part of the area of the image data to another part of the area and performs rotation processing of the another part of the area, and wherein the reproducing device reproduces the another part of the area, which was subjected to the rotation processing.

The above-described objects of the present invention, and the advantages thereof, will become fully apparent from the following detailed description of the embodiments.

BRIEF DESCRIPTION OF THE DRAWINGS

FIG. 1 is a block diagram schematically showing a configuration of an electronic still camera according to a first to third embodiments of the invention;

FIG. 8 shows a settable area of an enlargement area in the first embodiment of the invention;

DETAILED DESCRIPTION OF PREFERRED EMBODIMENTS

Figure 2A:
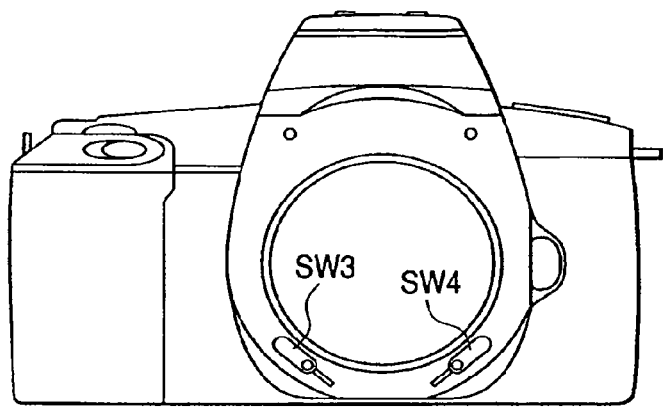
FIGS. 2A, 2B, and 2C are views for illustrating a function of a lengthwise-or-widthwise position detection circuit in FIG. 1.

Preferred embodiments of the invention will be described in detail below referring to the accompanying drawings.
First Embodiment FIG. 1 is a block diagram schematically showing a configuration of an electronic still camera according to a first embodiment of the invention. In FIG. 1, the electronic still camera includes a photographing lens 1, an image pickup element 2, a signal processing circuit 3, a buffer memory 4, am image processing circuit 5, a recording circuit 6, a memory card 7, a drive circuit 8, a control circuit 9, an AF circuit 10, an AE circuit 11, an electronic dial switch 12, an electronic sub-dial switch 13, a lengthwise-or-widthwise position detection circuit 14, a reproduction circuit 15, an LCD monitor 16, a release switch 17, and a storage circuit 18.

The image pickup element 2 includes, e.g. CMOS or a CCD image sensor which receives an object through the photographing lens 1 and photo-electrically converts the object. The signal processing circuit 3 converts a signal output from the image pickup element 2 into a digital signal. The buffer memory 4 temporarily stores the image data, and the image processing circuit 5 converts the image data stored in the buffer memory 4 into a predetermined video signal.

The recording circuit 6 records the video signal on a recording medium, the memory card 7 records the image thereon, and the drive circuit 8 drives the photographing lens 1 to a focal position. The control circuit 9 controls the signal processing circuit 3, the image processing circuit 5, recording circuit 6, and the like.

The AF circuit 10 automatically detects the focal point, and the AE circuit 11 determines exposure of a photographed image. The electronic dial switch 12 is used to change reproducing areas during enlargement reproduction, and the electronic sub-dial switch 13 is a switch which is used for changing the reproducing images, the so-called frame feeding. The lengthwise-or-widthwise position detection circuit 14 detects the attitude of the electronic still camera, and the detail function of the lengthwise-or-widthwise position detection circuit 14 is described later. The reproduction circuit 15 reproduces the photographed image, the LCD monitor 16 displays the photographed image and various setting items, and the storage circuit 18 stores adjustment values and various settings of the electronic still camera.

Figure 2B:
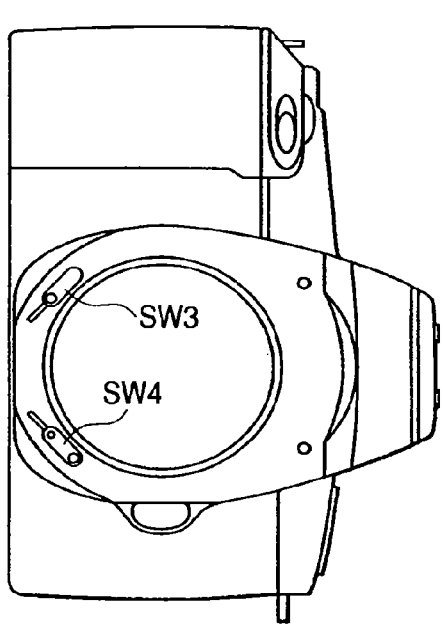
Figure 2C:
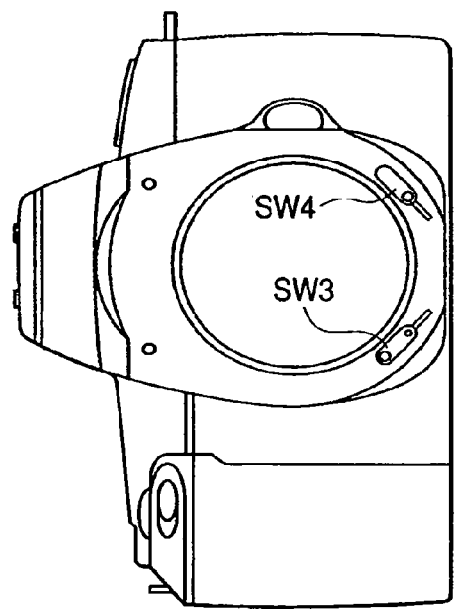

FIGS. 2A, 2B, and 2C are views for illustrating the function of the lengthwise-or-widthwise position detection circuit 14 shown in FIG. 1.

FIG. 2A shows that the electronic still camera is in a widthwise state, FIG. 2B shows that the electronic still camera is in a lengthwise state in which the release switch 17 of the electronic still camera is located on an upper side, and FIG. 2C shows that the electronic still camera is in the lengthwise state in which the release switch 17 of the electronic still camera is located on a lower side.

As shown in FIGS. 2A to 2C, two switches (or mercury switches) SW3 and SW4 in which a metal ball is movable are arranged in a camera body. As shown in FIG. 2A, in the case where the electronic still camera is in the widthwise state, the metal balls in the switches SW3 and SW4 proceed downward by gravity and both the switches SW3 and SW4 are turned on. As shown in FIG. 2B, in the case where the electronic still camera is in the lengthwise state in which the release switch 17 is located on the upper side, the switch SW3 is turned on and the switch SW4 is turned off. As shown in FIG. 2C, in the case where the electronic still camera is in the lengthwise state in which the release switch 17 is located on the lower side, the switch SW3 is turned off and the switch SW4 is turned on. The electronic still camera of the embodiment can detect the attitude of the camera including a position of the release switch 17 on the basis of on or off-state of the switches SW3 and SW4.

Figure 3:
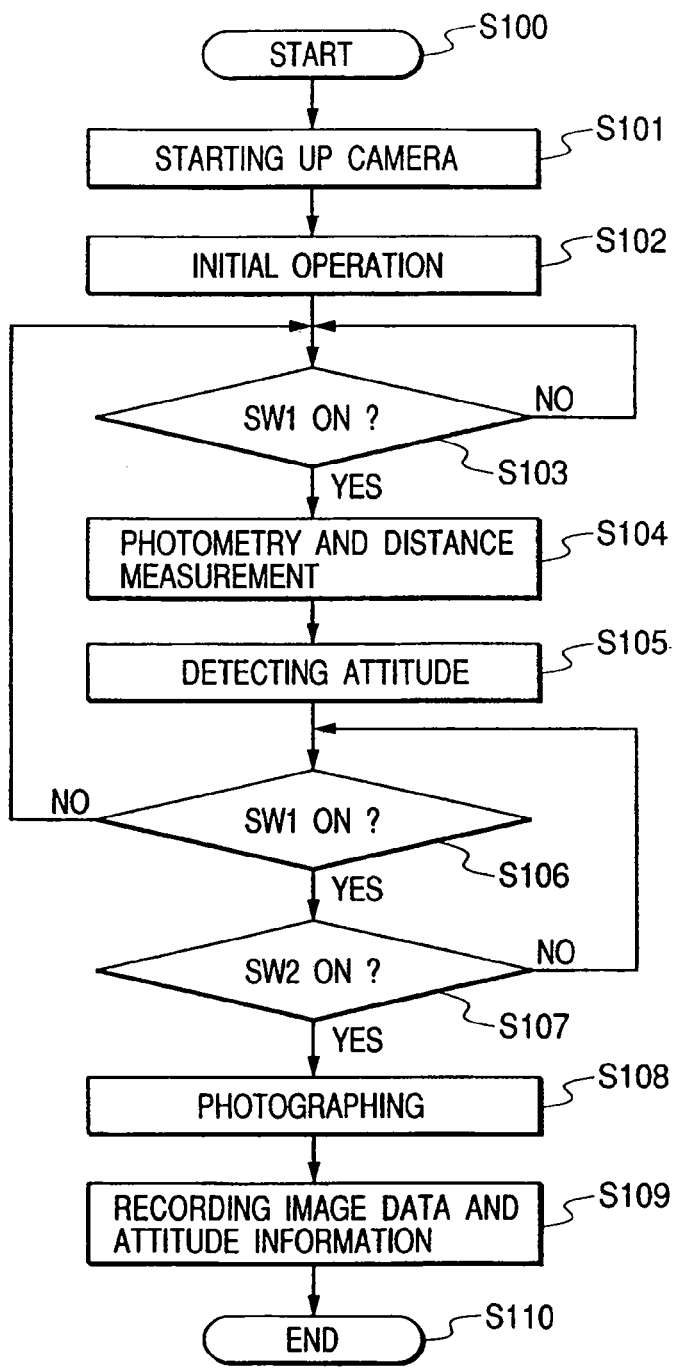
FIG. 3 is a flow chart showing camera operation in the first embodiment of the invention.

The photographing operation of the electronic still camera will be described below referring to FIG. 3.

The operation is started in Step S100. When the electronic still camera is started up by turning on the power with a power switch (not shown) in Step S101, the initial operation such as battery check, confirmation of mounting of the lens, or the like is performed in Step S102.

When a first stroke switch SW1 of the release switch 17 is turned on in Step S103, an exposure value is determined in such a manner that the AE circuit 11 is activated by the control circuit 9 to perform photometric operation. Further, the AF circuit 10 is activated by the control circuit 9 to perform ranging operation.

In Step S105, it is decided on the basis of detection result of the lengthwise-or-widthwise position detection circuit 14 whether the attitude of the electronic still camera is in the widthwise state or in the lengthwise state. Further, in the case where the electronic still camera is in the lengthwise state, it is decided on the basis of detection result of the lengthwise-or-widthwise position detection circuit 14 whether the release switch 17 is located on the upper side or the lower side. In Step S106, in the case where the first stroke switch SW1 is maintained to be in the on-state after completing photographing preparation, the photographing operation of the electronic still camera becomes a standby state to wait turn-on of a second stroke switch SW2 of the release switch 17 while holding the attitude information, the ranging information, and the exposure value data, and then the photographing operation proceeds to Step S107. On the other hand, in the case where the first stroke switch SW1 is in the off-state, the photographing operation proceeds to Step S103.

When the second stroke switch SW2 is turned on in Step S107, the photographing operation is performed in Step S108. In Step S108, the object is exposed onto the image pickup element 2 by receiving the signal from the control circuit 9 to release a shutter mechanism (not shown), and the image of the subject is photo-electrically converted. Then, the photo-electrically converted object is converted into digital data by the signal processing circuit 3 and temporarily stored in the buffer memory 4. In Step S109, the data stored in the buffer memory 4 is converted into predetermined image data by the image processing circuit 5 and recorded onto the memory card 7 by the recording circuit 6. At this point, the attitude information detected onto Step S105 is recorded in connection with the image data. Further, photographing number information indicating a photographed frame number is also simultaneously recorded. The photographing operation is ended in Step S110.

Figure 4:
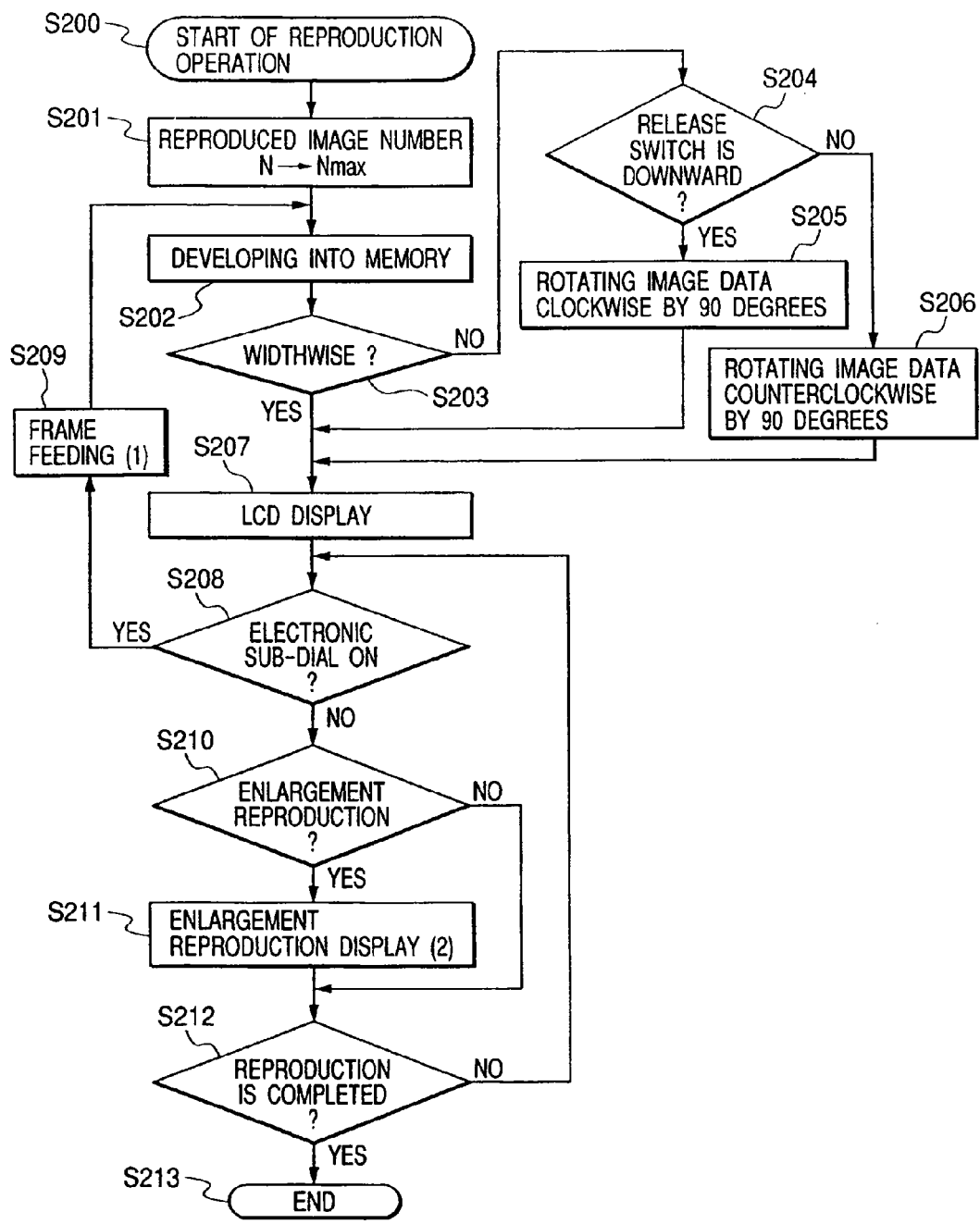
FIG. 4 is a flow chart showing reproduction operation in the first embodiment of the invention.

FIG. 4 is the flow chart showing the reproduction operation of the electronic still camera. The reproduction operation of the electronic still camera will be described below.

When a mode setting switch (not shown) is depressed to place the electronic still camera in a reproduction mode, the reproduction operation is started in Step S200. In Step S201, the final photographing number Nmax is set to a reproduced image number N which is displayed on the LCD monitor 16. That is to say, immediately after the start of the reproduction operation, the photographed image data which has been finally photographed is selected as the reproduced image data.

In Step S202, the image data of the photographing number N which is recorded on the memory card 7 is read out and loaded in a predetermined format into the buffer memory 4 through the image processing circuit 5.

In Step S203, it is decided whether the attitude information recorded in connection with the image data of the reproduced image number N is the widthwise position or not. In the case where the attitude information is the widthwise position, the reproduction operation proceeds to Step S207, the image data is transmitted to the reproduction circuit 15 and converted into the signal which can be displayed on the LCD monitor 16, and the image data is displayed on the LCD monitor 16.

In the case where the attitude information is not the widthwise position, the reproduction operation proceeds to Step S204, it is decided whether the release switch 17 is in the lower lengthwise state or not. In the case where the release switch 17 is located on the lower side, the reproduction operation proceeds to Step S205. In Step S205, the image data is rotated clockwise by 90 degrees, and the image data is transmitted to the reproduction circuit 15. In Step S207, the image data is converted into the signal which can be displayed on the LCD monitor 16, and the image data which has been rotated clockwise by 90 degrees is displayed on the LCD monitor 16.

In the case where the release switch 17 is located on the upper side, the reproduction operation proceeds to Step S206. In Step S206, the image data is rotated counterclockwise by 90 degrees. In Step S207, the image data is transmitted to the reproduction circuit 15 and converted into the signal which can be displayed on the LCD monitor 16, and the image data which has been rotated counterclockwise by 90 degrees is displayed on the LCD monitor 16. When the lengthwise position image is displayed on the LCD monitor 16, the conversion is performed by the reproduction circuit 15 so that the whole image data is displayed.

Figure 5A:
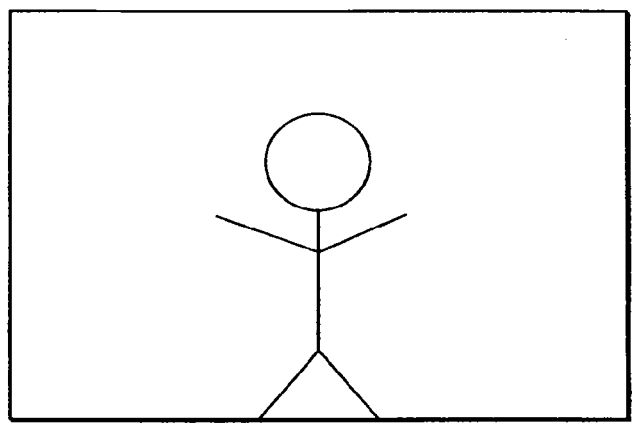
FIGS. 5A and 5B show one of display examples on an LCD monitor in the first embodiment of the invention.
Figure 5B:
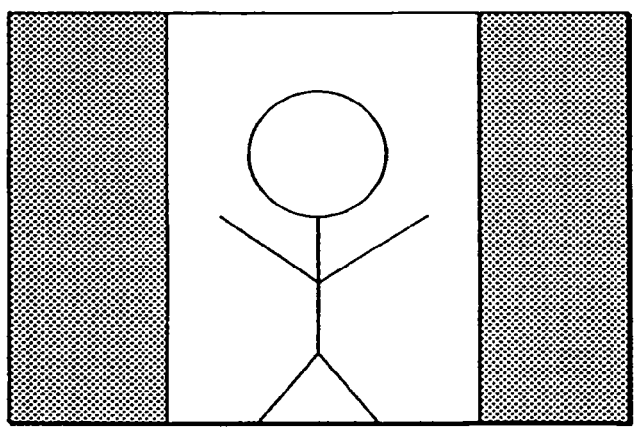

FIGS. 5A and 5B show one of display examples in which the widthwise position photographed image and the lengthwise position photographed image are reproduced on the LCD monitor 16 respectively.

In the widthwise position photographed image, as shown in FIG. 5A, the photographed image is displayed on the whole area of the LCD monitor 16. In the lengthwise position photographed image, as shown in FIG. 53, for example the image in which black images are added to both sides of the image is displayed on the whole area of the LCD monitor 16 so that the whole photographed image which has been rotated by 90 degrees is displayed.

Figure 6:
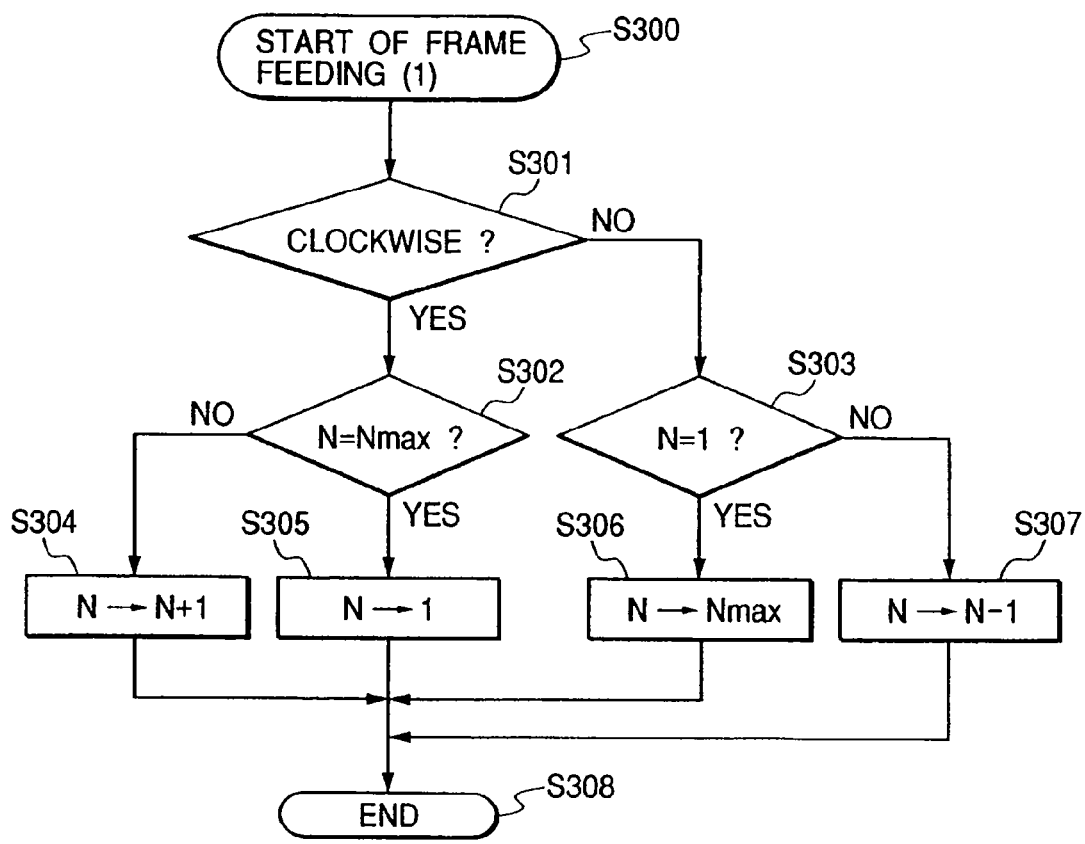
FIG. 6 is a flow chart showing frame feeding operation in the first embodiment of the invention.

In Step S208, it is decided whether the electronic sub-dial switch 13 is depressed or not. In the case where the electronic sub-dial switch 13 is depressed, the reproduction operation proceeds to Step S209, and frame feeding reproduction is performed according to the flow chart shown in FIG. 6. Then, the frame feeding reproduction operation will be described referring to FIG. 6.

When the flow chart of the frame feeding reproduction operation is started in Step S300, it is decided in Step S301 whether the electronic sub-dial switch 13 is depressed in the clockwise direction or not. In the case where one click of the electronic sub-dial switch 13 is performed in the clockwise direction, the frame feeding reproduction operation proceeds to Step S302, and it is decided whether the reproduced image number N is equal to the final photographing number Nmax or not. In the case where the reproduced image number N is equal to the final photographing number Nmax, the frame feeding reproduction operation proceeds to Step S305, and the reproduced image number N is set to 1. In the case where the reproduced image number N is not equal to the final photographing number Nmax, the frame feeding reproduction operation proceeds to Step S304, and 1 is added to the reproduced image number N to update the reproduced image number N.

In the case where one click of the electronic sub-dial switch 13 is performed in the counterclockwise direction in Step S301, the frame feeding reproduction operation proceeds to Step S303, and it is decided whether the reproduced image number N is 1 or not. In the case where the reproduced image number N is 1, the frame feeding reproduction operation proceeds to Step S306, and the final photographing number Nmax is set to the reproduced image number N. In the case where the reproduced image number N is not 1, the frame feeding reproduction operation proceeds to Step S307, and 1 is subtracted from the reproduced image number N to upgrade the reproduced image number N. The frame feeding reproduction operation is ended in Step S308.

When the electronic sub-dial switch 13 is depressed during reproduction display, the reproduced image number is increased in each one click in the clockwise direction, and the image which has been photographed immediately after the image currently reproduced is selected. At this point, in the case where the image currently reproduced is the finally photographed image, the image initially photographed is selected.

Further, the reproduced image number is decreased in each one click in the counterclockwise direction, and the image which has been photographed immediately before the image currently reproduced is selected. At this point, in the case where the image currently reproduced is the initially photographed image, the finally photographed image is selected.

When the frame feeding operation is executed in Step S209, the reproduction operation proceeds to Step S202, and the image data of the reproduced image number N which is set by the frame feeding operation is read out from the memory card 7 and loaded in the predetermined format into the buffer memory 4 through the image processing circuit 5.

In the case where the electronic sub-dial switch 13 is not depressed in Step S208, the reproduction operation proceeds to Step S210. In Step S210, an enlargement switch (not shown) is depressed to decide whether an enlargement reproduction mode is set or not. In the case where the enlargement reproduction mode is set, the reproduction operation proceeds to Step S211, and enlargement reproduction display is performed according to the flow chart shown in FIG. 7. In the case where the enlargement reproduction mode is not set, the reproduction operation proceeds to Step S212. In Step S212, it is decided whether the end of the reproduction mode is selected by a mode setting switch (not shown) or not. In the case where the end of the reproduction mode is not selected, the reproduction operation proceeds to Step S208, and the reproduction of the image is continued. In the case where the end of the reproduction mode is selected, the reproduction operation is ended in Step S213.

Figure 7:
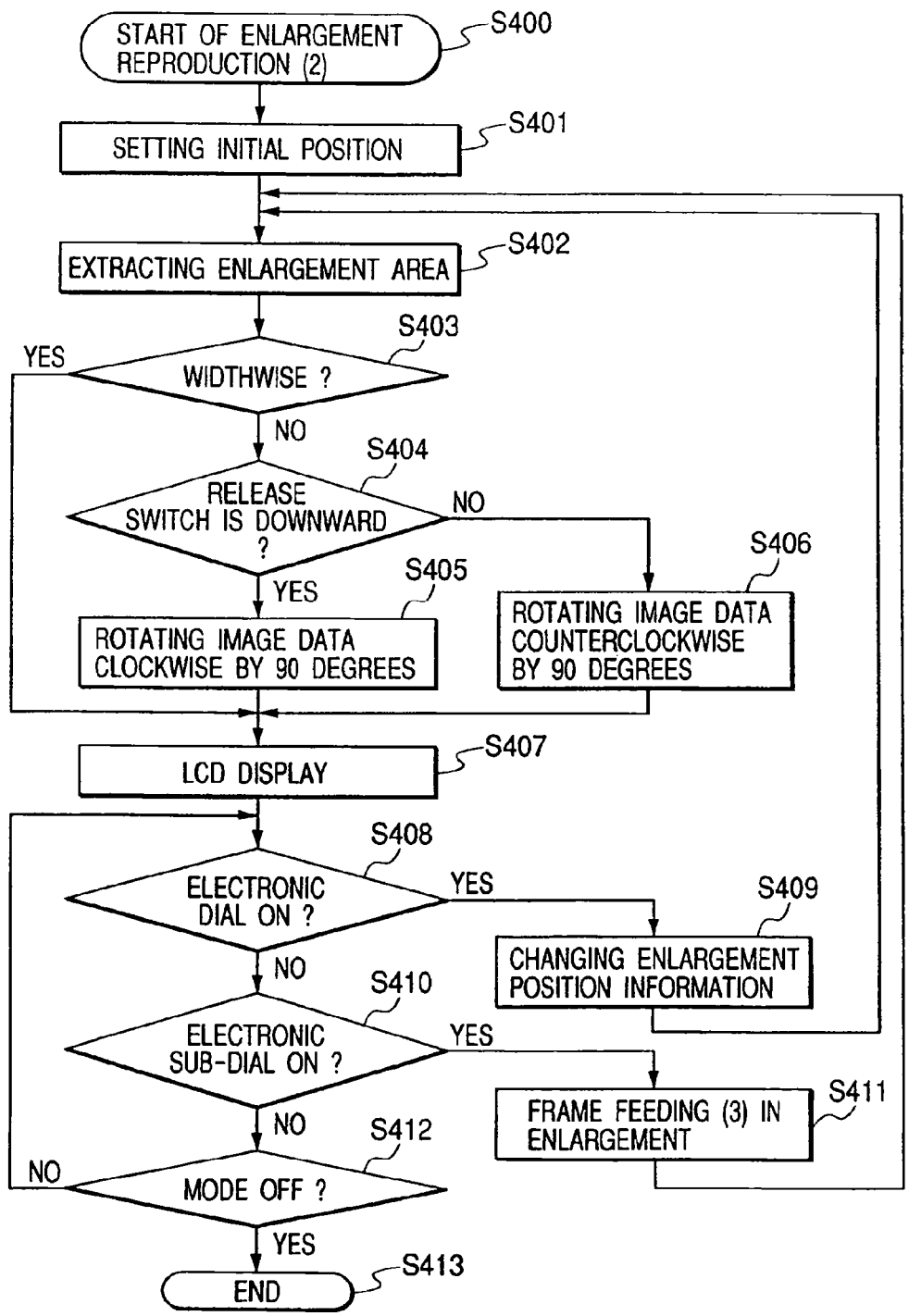
FIG. 7 is a flow chart showing enlargement reproducing operation in the first embodiment of the invention.
Figure 8:
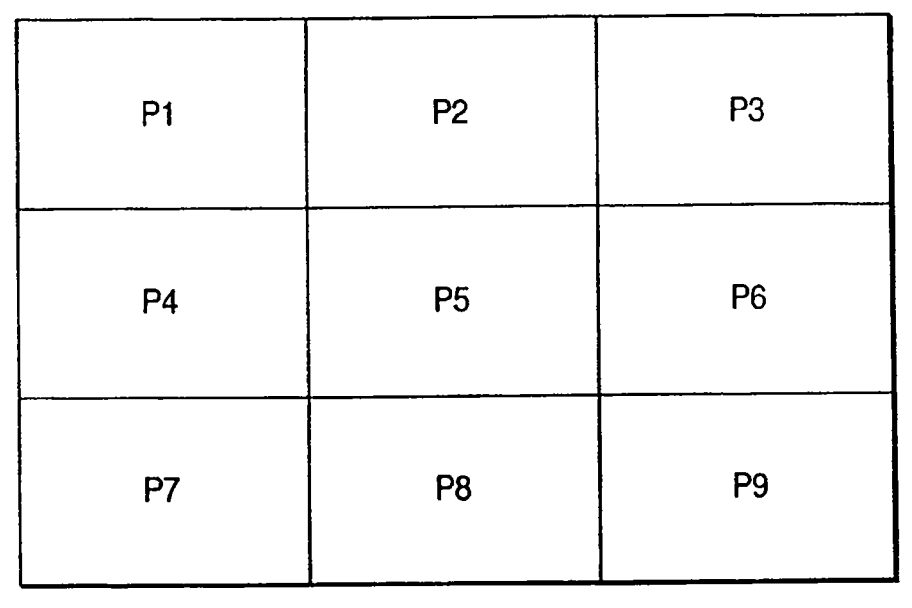

The reproduction operation in the enlargement reproduction mode will be described referring to the flow chart shown in FIG. 7 and FIG. 8. FIG. 8 shows one of relationships between the photographed image data and an enlargement area, when magnification is set to three times. The following description will be performed for the magnification of three times.

The operation is started in Step S400. In Step S401, an initial position is set as position information of the area where the enlargement display is performed on the LCD monitor 16. At this point, an enlargement area P5 which is of a divided image area corresponding to a central region of the image is set to the initial position. In Step S402, the set enlargement area of enlargement position information is extracted into a predetermined size from the image data stored in the buffer memory 4.

In Step S403, it is decided whether the attitude information in photographing the image data is widthwise position or not. In the case where the attitude information is the widthwise position, the operation proceeds to Step S407, the extracted image data is converted into the signal which can be displayed on the LCD monitor 16 by the reproduction circuit 15, and the enlargement image is displayed on the LCD monitor 16.

In the case where the attitude information is not the widthwise position, the operation proceeds to Step S404, and it is decided whether the electronic still camera is in the lengthwise state in which the release switch 17 is located on the lower side or not. In the case where the electronic still camera is in the lengthwise state in which the release switch 17 is located on the lower side, the operation proceeds to Step S405. In Step S405, the extracted image data is rotated clockwise by 90 degrees, and the extracted image data is transmitted to the reproduction circuit 15. In Step S407, the extracted image data is converted into the signal which can be displayed on the LCD monitor 16, and the enlargement image which has been rotated clockwise by 90 degrees is displayed on the LCD monitor 16.

In the case where the electronic still camera is in the lengthwise state in which the release switch 17 is located on the upper side in Step S404, the operation proceeds to Step S406. In Step S406, the extracted image data is rotated counterclockwise by 90 degrees, and the extracted image data is transmitted to the reproduction circuit 15. In Step S407, the extracted image data is converted into the signal which can be displayed on the LCD monitor 16 by the reproduction circuit 15, and the enlargement image which has been rotated counterclockwise by 90 degrees is displayed on the LCD monitor 16.

In Step S408, it is decided whether the electronic dial switch 12 is depressed or not. In the case where the electronic dial switch 12 is depressed, the operation proceeds to Step S409. In Step S409, the enlargement area is changed in order from the central portion P5 such as the order of P5→P6→P7→P8→P9→P1→P2→P3→P4→ . . . in each one click in the clockwise direction of the electronic dial switch 12. Then, the image data of the enlargement area change by the electronic dial switch 12 is extracted in Step S402.

Further, the enlargement area is changed in an order such as P5→P4→P3→P2→P1→P9→P8→P7→P6→ . . . in each one click in the counterclockwise direction of the electronic dial switch 12, and the selected image area is extracted in the similar manner. In the case where the electronic dial switch 12 is not depressed, the operation proceeds to Step S410, and it is decided whether the electronic sub-dial switch 13 is depressed or not. In the case where the electronic sub-dial switch 13 is depressed, the operation proceeds to Step S411, and the frame feeding reproduction operation during the enlargement reproduction is performed according to the flow chart shown in FIG. 9.

Figure 9:
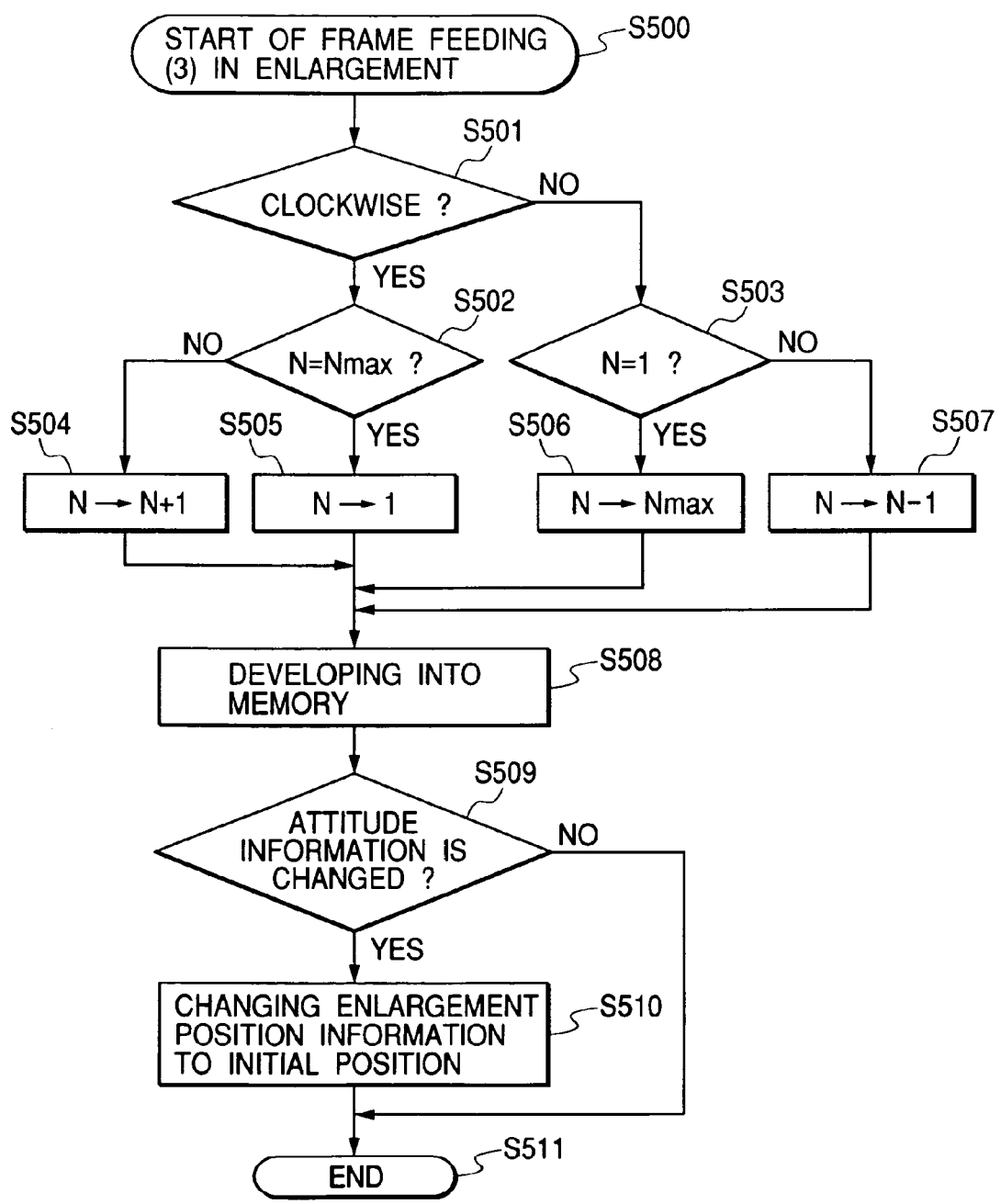
FIG. 9 is a flow chart showing the frame feeding operation during enlargement reproduction in the first embodiment of the invention.

The frame feeding reproduction operation during the enlargement reproduction will be described referring to the flow chart shown in FIG. 9.

When the flow chart of the frame feeding reproduction display is started in Step S500, it is decided in Step S501 whether the electronic sub-dial switch 13 is depressed in the clockwise direction or not. In the case where one click of the electronic sub-dial switch 13 is performed in the clockwise direction, the operation proceeds to Step S502, and it is decided whether the reproduced image number N is equal to the final photographing number Nmax or not. In the case where the reproduced image number N is equal to the final photographing number Nmax, the operation proceeds to Step S505, and 1 is set to the reproduced image number N. In the case where the reproduced image number N is not equal to the final photographing number Nmax, the operation proceeds to Step S504, and 1 is added to the reproduced image number N to update the reproduced image number N.

In the case where one click of the electronic sub-dial switch 13 is performed in the counterclockwise direction in Step S501, the operation proceeds to Step S503, and it is decided whether the reproduced image number N is 1 or not. In the case where the reproduced image number N is 1, the operation proceeds to Step S506, and the final photographing image number Nmax is set to the reproduced image number N. In the case where the reproduced image number N is not 1, the operation proceeds to Step S507, and 1 is subtracted from the reproduced image number N to update the reproduced image number N. Then, the operation proceeds to Step S508, and the image data of the photographing image number N which is recorded on the memory card 7 is read out and loaded in the predetermined format into the buffer memory 4 through the image processing circuit 5.

In Step S509, it is decided whether the attitude information of the image data before the frame feeding is changed from the attitude information of the image data which is read after the frame feeding. In the case where the attitude information is changed, the operation proceeds to Step S510, and the information of the enlargement area is changed to the initial position P5. In the case where the change in the attitude does not occurs, the information of the enlargement area which is set to the reproduced image before the frame feeding is maintained.

Then, the operation proceeds to Step S511, and the frame feeding operation during the enlargement reproduction is ended. When the frame feeding operation during the enlargement reproduction is executed by the above flow chart, the reproduction operation in the enlargement reproduction mode proceeds to Step S402, and the enlargement area is extracted from the image data loaded into the buffer memory 4. In Step S407, in the case where the extracted image data is the widthwise image, the selected enlargement area is displayed on the LCD monitor 16. In the case where the extracted image data is the lengthwise image, the image data of the enlargement area which has been rotated by 90 degrees in the clockwise or counterclockwise direction according to the position of the release switch 17 is displayed on the LCD monitor 16.

When the electronic sub-dial switch 13 is depressed during the reproduction display, the reproduced image number is increased in each one click in the clockwise direction, and the image which has been photographed immediately after the image currently reproduced is selected. Further, the reproduced image number is decreased in each one click in the counterclockwise direction, and the image which has been photographed immediately before the image currently reproduced is selected. In the case where the change in the attitude occurs during the frame feeding, the information of the area where the enlargement reproduction is performed is changed to the initial position.

Figure 10:
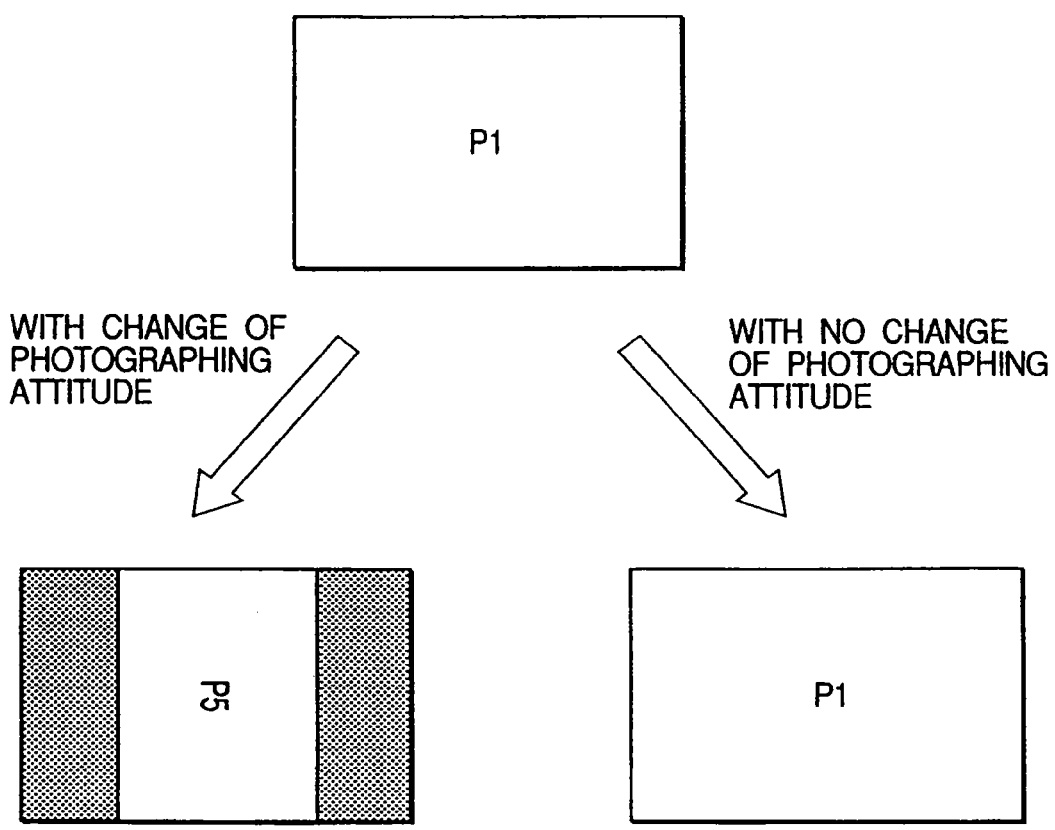
FIG. 10 shows one of enlargement display examples in the frame feeding operation during the enlargement reproduction in the first embodiment of the invention.

As shown in FIG. 10, when the enlargement display is performed in the area P1 of the widthwise photographed image, in the case where the change in the attitude does not occur during the frame feeding, the same area P1 is also displayed in the photographed image of the next frame. In the case where the widthwise photographed image is changed to the lengthwise photographed image, the area P5 which is of the initial position is displayed. In the case where the enlargement image of the lengthwise photographed image is displayed, in order to match an aspect ratio of the enlargement image with the aspect ratio of the LCD monitor 16, the image data in which the black images are added to the both sides of the display area is displayed on the LCD monitor 16. In order to display the image on the whole LCD monitor 16, it is also possible that, while the selected enlargement area is included, a wider enlargement area is extracted so that the image is displayed on the whole LCD monitor 16. In the case where the electronic sub-dial 13 is depressed by the above operation in Step S410, the frame feeding operation in the enlargement reproduction is executed.

In the case where the electronic sub-dial 13 is not depressed in Step S410, the operation proceeds to Step S412, and it is decided whether the end of the enlargement reproduction is set by the mode setting switch (not shown) or not. In the case where the end of the enlargement reproduction is not set in Step S412, the operation proceeds to Step S408. In the case where the end of the enlargement reproduction is not set in Step S412, the operation proceeds to Step S413, and the enlargement reproduction operation is ended.

When the attitude information during photographing is changed in performing the frame feeding of the enlargement reproduction mode, the enlargement area automatically returns to the initial position. When the attitude information during photographing is not changed, the enlargement area is maintained. Accordingly, in the case where confirmation of details in the photographed image is continuously performed, even if the change in the photographing attitude occurs, the confirmation can be rapidly performed and natural operation feeling for the photographer can be realized.

In the embodiment, although the case in which the magnification is three times is described, the invention can be applied to an arbitrary magnification. Even in the case where trimming processing of the specified area is performed while the magnification is set to one time, the invention can be applied. Although the central portion of the image is shown as an example of the initial position in changing the attitude, for example, it is also possible that the initial position of the enlargement area is configured to be stored in the storage circuit 18 so that the user sets the initial position to a desired position.

Second Embodiment

A second embodiment of the invention will be described. The electronic still camera of the second embodiment has the substantially same configuration as the first embodiment shown in FIG. 1, the attitude during photographing is detected by the lengthwise-or-widthwise detection circuit 14, and the image data is recorded on the memory card 7 in connection with the attitude information.

Figure 11:
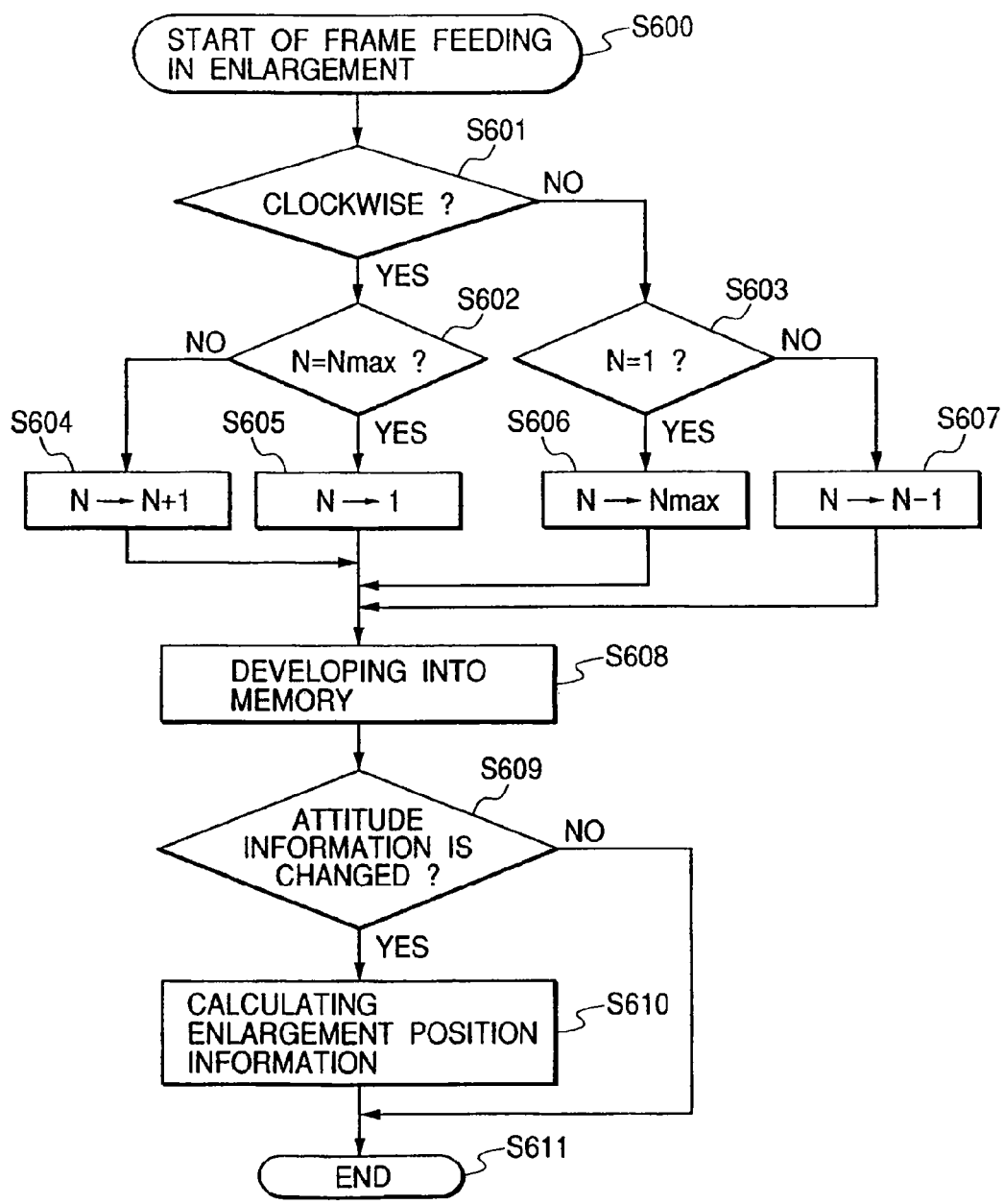
FIG. 11 is a flow chart showing the frame feeding operation during the enlargement reproduction in a second embodiment of the invention.

FIG. 11 is the flow chart showing the operation involving the frame feeding during the enlargement reproduction of the electronic still camera of the embodiment. The frame feeding operation during the enlargement reproduction of the electronic still camera will be described below.

When the electronic sub-dial switch 13 is depressed during performing the enlargement reproduction of the image data of the reproduced image number N, the flow chart of the frame feeding reproduction display is started in Step S600. In Step S601, it is decided whether the electronic sub-dial switch 13 is depressed in the clockwise direction or not.

In the case where one click of the electronic sub-dial switch 13 is performed in the clockwise direction, the operation proceeds to Step S602, and it is decided whether the reproduced image number N is equal to the final photographing number Nmax or not. In the case where the reproduced image number N is equal to the final photographing number Nmax, the operation proceeds to Step S605, and 1 is set to the reproduced image number N. In the case where the reproduced image number N is not equal to the final photographing number Nmax, the operation proceeds to Step S604, and 1 is added to the reproduced image number N to update the reproduced image number N.

In the case where one click of the electronic sub-dial switch 13 is performed in the counterclockwise direction in Step S601, the operation proceeds to Step S603, and it is decided whether the reproduced image number N is 1 or not. In the case where the reproduced image number N is 1, the operation proceeds to Step S606, and the final photographing number Nmax is set to the reproduced image number N. In the case where the reproduced image number N is not 1, the operation proceeds to Step S607, and 1 is subtracted from the reproduced image number N to update the reproduced image number N.

Then, the operation proceeds to Step S608, and the image data of the photographing image number N which is recorded in the memory card 7 is read out and loaded in the predetermined format into the buffer memory 4 through the image processing circuit 5.

In Step S609, it is decided whether the attitude information of the image data before the frame feeding is changed from the attitude information of the image data which is read after the frame feeding. In the case where the attitude information is not changed, the enlargement position information at the immediately preceding frame is maintained, and the operation proceeds to Step S611. In the case where the attitude information is changed, the operation proceeds to Step S610, and the enlargement position information is calculated.

Figure 12A:
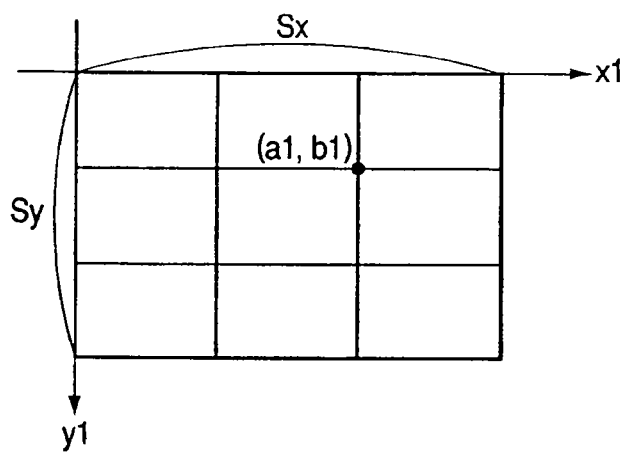
FIGS. 12A, 12B, and 12C show a parameter of image data used for calculation of enlargement position information in the second embodiment of the invention.
Figure 12B:
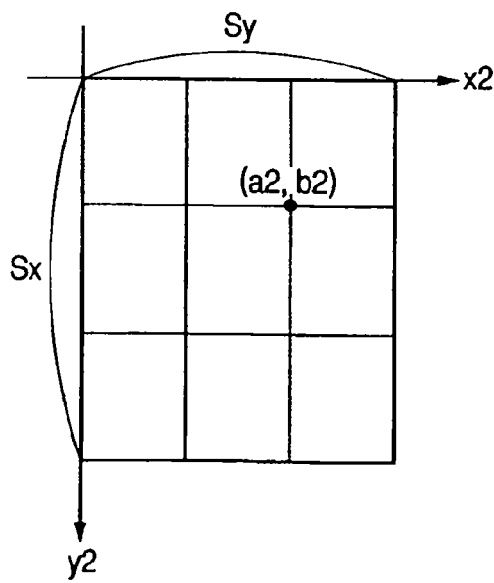
Figure 12C:
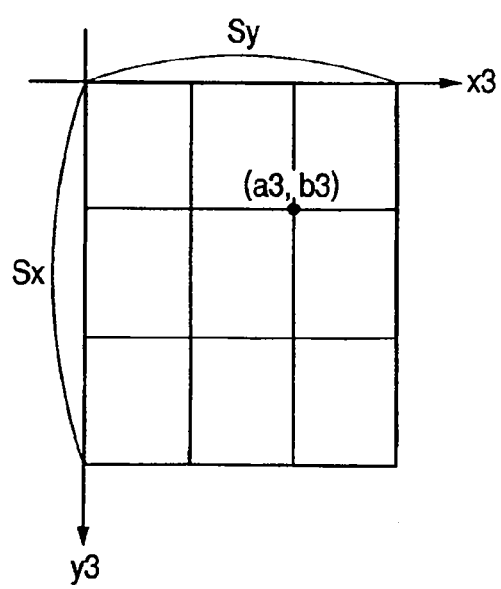

FIGS. 12A, 12B, and 12C show a parameter of the image data used for the calculation of the enlargement position information. FIG. 12A shows the image data on a coordinate system in which an image data size in the widthwise position is set to Sx and Sy, an origin is located at the upper left of the image data, and the horizontal axis is set to an x1 axis and the vertical axis is set to a y1 axis. The coordinate of a starting point indicating the upper left of the enlargement area is set to (a1,b1) in the x1-y1 coordinate system. FIG. 12B shows the image data when the image data is rotated by 90 degrees in the clockwise direction, i.e. the image data picked up while the release switch 17 is located on the lower side is shown on the coordinate system in which the horizontal axis is set to an x2 axis and the vertical axis is set to a y2 axis. The coordinate of the starting point indicating the upper left of the enlargement area is set to (a2,b2) in the x2-y2 coordinate system. FIG. 12C shows the image data when the image data is rotated by 90 degrees in the counterclockwise direction, i.e. the image data picked up while the release switch 17 is located on the upper side is shown on the coordinate system in which the horizontal axis is set to an x3 axis and the vertical axis is set to a y3 axis. The coordinate of the starting point indicating the upper left of the enlargement area is set to (a3,b3) in the x3-y3 coordinate system.

Assuming that the magnification is set to three times, a method of calculating the enlargement area will be described.

Assuming that the photographing attitude of the image in which the enlargement reproduction is being performed is the widthwise position and the coordinate of the starting point of the selected enlargement area is (a1,b1) in the x1-y1 coordinate system, since the magnification is three times in the size of the enlargement area, the image data size in the x1 axis direction is Sx/3 and the image data size in the y1 axis direction is Sy/3. In the case where Sx/3 and Sy/3 are not integers, the fractional parts of Sx/3 and Sy/3 are rounded.

When the reproduced image is changed by the frame feeding operation, in the case where the attitude information of the image data immediately after the frame feeding is equal to the attitude information of the image data immediately before the frame feeding, i.e. in the case the image data immediately after the frame feeding is widthwise position, the starting point information and size of the enlargement area are maintained. In the case where the image data immediately after the frame feeding is the lengthwise position attitude in which the release switch 17 is located on the lower side, the coordinate system is changed to the x2-y2 coordinate system, and the starting point (a2,b2) of the enlargement area is calculated from the following equations 1 and 2.

$$a2 = \frac{Sy}{Sx} * a1 \qquad \text{Equation 1}$$

$$b2 = \frac{Sx}{Sy} * b1 \qquad \text{Equation 2}$$

The starting point of the enlargement area is determined so that ratios a1/Sx and b1/Sy of the image sizes Sx and Sy to the starting points a1 and b1 in the x1-y1 coordinate system before the conversion correspond to the ratios a2/Sx and b2/Sy of the image sizes to the starting points in the x2-y2 coordinate system after the conversion respectively. In the case where the calculation results of the equations 1 and 2 are not integers, the fractional parts of the calculation results are rounded.

In the case where the image data immediately after the frame feeding is lengthwise position attitude in which the release switch 17 is located on the upper side, the coordinate system is changed to the x3-y3 coordinate system, and the starting point (a3,b3) of the enlargement area is calculated from the following equations 3 and 4.

$$a3 = \frac{Sy}{Sx} * a1 \qquad \text{Equation 3}$$

$$b3 = \frac{Sx}{Sy} * b1 \qquad \text{Equation 4}$$

The starting point of the enlargement area is determined so that ratios a1/Sx and b1/Sy of the image sizes Sx and Sy to the starting points a1 and b1 in the x1-y1 coordinate system before the conversion correspond to the ratios a3/Sx and b3/Sy of the image sizes to the starting points in the x3-y3 coordinate system after the conversion respectively. In the case where the calculation results of the equations 3 and 4 are not integers, the fractional parts of the calculation results are rounded.

In the case where the magnification of the size of the enlargement area is three times and the camera attitude is in the widthwise position state, the image size in the x1 axis direction becomes Sx/3 and the image size in the y1 axis direction becomes Sy/3. In the case where the magnification of the size of the enlargement area is three times and the camera attitude is in the lengthwise position state in which the release switch 17 is located on the lower side, the image size in the x2 axis direction becomes Sx/3 and the image size in the y2 axis direction becomes Sy/3. In the case where the magnification of the size of the enlargement area is three times and the camera attitude is in the lengthwise position state in which the release switch 17 is located on the upper side, the image size in the x3 axis direction becomes Sx/3 and the image size in the y3 axis direction becomes Sy/3.

The enlargement position information after frame feeding is set by the above calculations, and the frame feeding operation in the enlargement is ended in Step S611. Even in the case where the attitude is changed from the lengthwise position to the widthwise position or even in the case where the position of the release switch 17 in the lengthwise position state is changed, the coordinate conversion and the calculation of the starting point of the extracting position are also performed on the basis of the concept described above.

The enlargement area is extracted from the image data by using the enlargement position information set by the above operation. In the case where the image data is the widthwise image, the selected enlargement area is displayed on the LCD monitor 16. In the case where the image data is the lengthwise image, the image data of the enlargement area is rotated by 90 degrees in the clockwise direction or in the counter clockwise direction according to the position of the release switch 17, and the image data of the enlargement area is displayed on the LCD monitor 16.

When the electronic sub-dial switch 13 is depressed during the reproduction display, 1 is added to the reproduced image number in each one click in the clockwise direction, and the image which has been photographed immediately after the image currently reproduced is selected. Further, 1 is subtracted from the reproduced image number in each one click in the counterclockwise direction, and the image which has been photographed immediately before the image currently reproduced is selected.

In the case where the attitude information of the image data before the frame feeding corresponds to the attitude information of the image data after the frame feeding, the enlargement reproduction of the same position is performed. In the case where the attitude information of the image data before the frame feeding differs from the attitude information of the image data after the frame feeding, the enlargement reproduction of the position where positional relationship is relatively maintained is performed. That is to say, for example the upper left of the image in the widthwise position is enlarged and confirmed in the image before changing the images, so that the upper left of the image in the lengthwise position can be also confirmed even in the case where the reproduction direction after changing the images is changed to the lengthwise position.

When the frame feeding of the enlargement reproduction mode is performed, the confirmation of the image can be rapidly performed even if the attitude of the photographer is changed, and the natural operation feeling for the photographer can be realized. In the embodiment, although the case in which the magnification is three times is shown, the invention can be also applied to an arbitrary magnification and an arbitrary enlargement area.

Third Embodiment

A third embodiment of the invention will be described. The electronic still camera in the third embodiment has the substantially similar configuration as the first embodiment shown in FIG. 1, the attitude during photographing is detected by the lengthwise-or-widthwise detection circuit 14, and the image data is recorded in the memory card 7 in connection with the attitude information.

Figure 13:
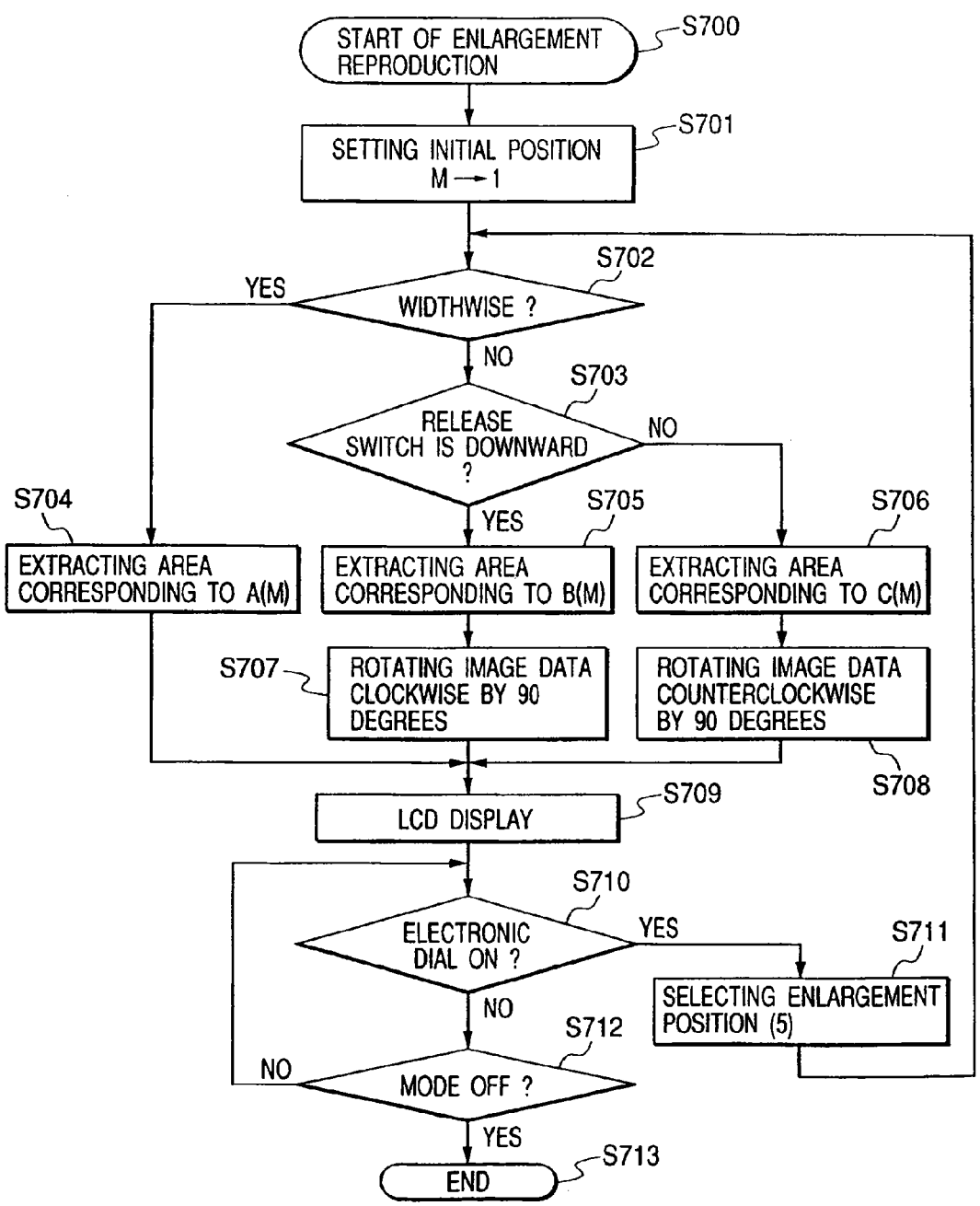
FIG. 13 is a flow chart showing the enlargement reproducing operation in a third embodiment of the invention.

FIG. 13 is the flow chart showing the operation involving the enlargement reproduction of the electronic still camera of the embodiment. The enlargement reproduction operation and the changing operation of the enlargement position in the enlargement reproduction of the electronic still camera will be described referring to FIG. 13.

Figure 15A:
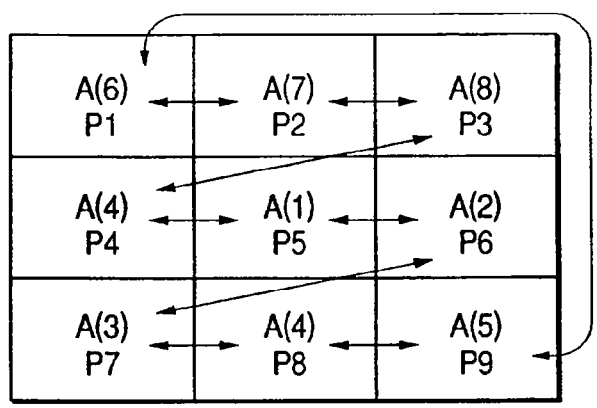
FIGS. 15A, 15B, and 15C show a change in enlargement position selecting sequence based on a photographing attitude in the third embodiment of the invention.
Figure 15B:
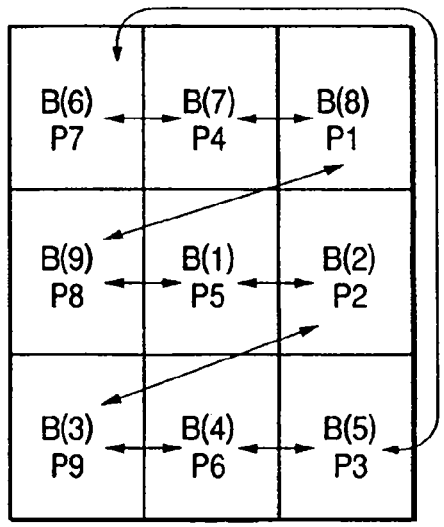
Figure 15C:
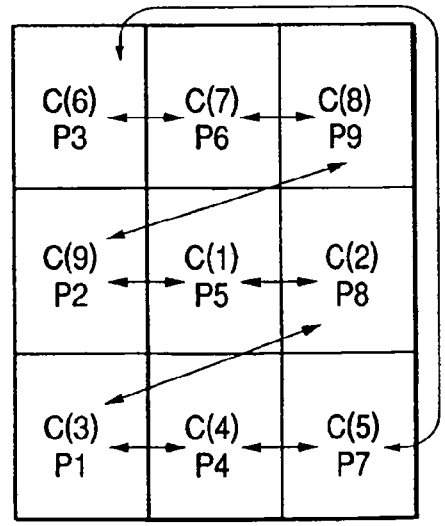

When an enlargement switch (not shown) is depressed to select the enlargement reproduction mode during the reproduction mode, the enlargement reproduction operation is started in Step S700. The initial position information of the area where the enlargement display is initially performed on the LCD monitor 16 is set in Step S701. FIGS. 15A, 15B, and 15C show one of sequences of selecting the enlargement settable area and enlargement area, in case that the magnification is three times. In FIGS. 15A, 15B, and 15C, P1, P2, P3, P4, P5, P6, P7, P8, and P9 are the area information for the image data and the information which is uniquely determined for the image data irrespective of the attitude information.

FIG. 15A shows the sequence in which the enlargement area is selected in the widthwise position. A(M) in FIG. 15A is the area selecting information in which selecting sequence information M is in connection with area information Pi. A relationship RA:Pi-A(M) between Pi and A(M) becomes P1-A(6), P2-A(7), P3-A(8), P4-A(9), P5-A(1), P6-A(2), P7-A(3), P8-A(4), and P9-A(5). The central portion P5 of the image data is set to the initial position in the enlargement area, the enlargement area is moved to the right side in a row direction, and the enlargement area is moved to the right end area. Then, the enlargement area is moved to the left end of the lower row.

FIG. 15B shows the sequence in which the enlargement area is selected in the lengthwise position in which the release switch 17 is located on the lower side. BM in FIG. 15B is the area selecting information in which the selecting sequence information M is in connection with the area information Pi. A relationship RB:Pi-B(M) between Pi and B(M) becomes P1-B(8), P2-B(2), P3-B(5), P4-B(7), P5-B(1), P6-B(4), P7-B(6), P8-B(9), and P9-B(3). The central portion P5 of the image data is set to the initial position in the enlargement area, the enlargement area for the image data rotated by 90 degrees in the clockwise direction is moved to the right side in the row direction, and the enlargement area is moved to the right end area. Then, the enlargement area is moved to the left end of the lower row.

FIG. 15C shows the sequence in which the enlargement area is selected in the lengthwise position in which the release switch 17 is located on the upper side. C(M) in FIG. 15C is the area selecting information in which the selecting sequence information M is in connection with the area information Pi. A relationship RC:Pi-C(M) between Pi and C(M) becomes P1-C(3), P2-C(9), P3-C(6), P4-C(4), P5-C(1), P6-C(7), P7-C(5), P8-C(2), and P9-C(8). The central portion P5 of the image data is set to the initial position in the enlargement area, the enlargement area for the image data rotated by 90 degrees in the counterclockwise direction is moved to the right side in the row direction, and the enlargement area is moved to the right end area. Then, the enlargement area is moved to the left end of the lower row.

The initial position set in Step S701 is in the area where the selecting sequence information M is 1, and the central portion P5 of the image data is selected irrespective of the attitude information. In Step S702, it is decided whether the attitude information in photographing the image data selected as the reproduced image is the widthwise position or not. In the case where the attitude information is the widthwise position, the operation proceeds to Step S704, and the area corresponding to the area selecting information A(M) is extracted from the image data stored in the buffer memory 4 into the predetermined size. In Step S709, the extracted image data is converted into the signal which can be displayed on the LCD monitor 16 by the reproduction circuit 15, and the enlargement image is displayed on the LCD monitor 16.

In the case where the attitude information is not the widthwise position, the operation proceeds to Step S703, and it is decided whether the attitude information is the lengthwise position in which the release switch 17 is located on the lower side or not. In the case where the attitude information is the lengthwise position in which the release switch 17 is located on the lower side, the operation proceeds to Step S705, and the area corresponding to the area selecting information B(M) is extracted from the image data stored in the buffer memory 4 into the predetermined size. In Step S707, the extracted image data is rotated by 90 degrees in the clockwise direction and transmitted to the reproduction circuit 15. In Step S709, the image data is converted into the signal which can be displayed on the LCD monitor 16 by the reproduction circuit 15, and the enlargement image which is rotated by 90 degrees in the clockwise direction is displayed on the LCD monitor 16.

In the case where it is decided in Step S703 that the attitude information is the lengthwise position in which the release switch 17 is located on the upper side, the operation proceeds to Step S706, and the area corresponding to the area selecting information C(M) is extracted from the image data stored in the buffer memory 4 into the predetermined size. In Step S708, the extracted image data is rotated by 90 degrees in the counterclockwise direction and transmitted to the reproduction circuit 15. In Step S709, the image data is converted into the signal which can be displayed on the LCD monitor 16 by the reproduction circuit 15, and the enlargement image which is rotated by 90 degrees in the counterclockwise direction is displayed on the LCD monitor 16.

In Step S710, it is decided whether the electronic dial switch 12 is depressed or not. In the case where the electronic dial switch 12 is depressed, the operation proceeds to Step S711, and the enlargement position changing operation is performed according to the flow chart shown in FIG. 13. Then, the enlargement position selecting operation will be described referring to the flow chart shown in FIG. 14.

When the enlargement position selecting operation is started in Step S800, it is decided in Step S801 whether the electronic dial switch 12 is depressed clockwise or not. In the case where the electronic dial switch 12 is depressed clockwise, the operation proceeds to Step S802, and it is decided whether the selecting sequence information M is 9 or not. In the case where the selecting sequence information M is 9, i.e. in the case where the selecting sequence information M is the maximum value, the operation proceeds to Step S804, and the initial value 1 is set to the selecting sequence information M. In the case where the selecting sequence information M is not the maximum value, the operation proceeds to Step S805, and the selecting sequence information M is changed by adding 1 to the selecting sequence information M.

In the case where the electronic dial switch 12 is depressed counterclockwise in Step S801, the operation proceeds to Step S802, and it is decided whether the selecting sequence information M is 1 or not. In the case where the selecting sequence information M is 1, i.e. in the case where the selecting sequence information M is the initial value, the operation proceeds to Step S806, and the initial value 1 is set to the selecting sequence information M. In the case where the selecting sequence information M is not the initial value, the operation proceeds to Step S807, and the selecting sequence information M is changed by subtracting 1 from the selecting sequence information M. Then, the enlargement position selecting operation is ended in Step S808.

Figure 14:
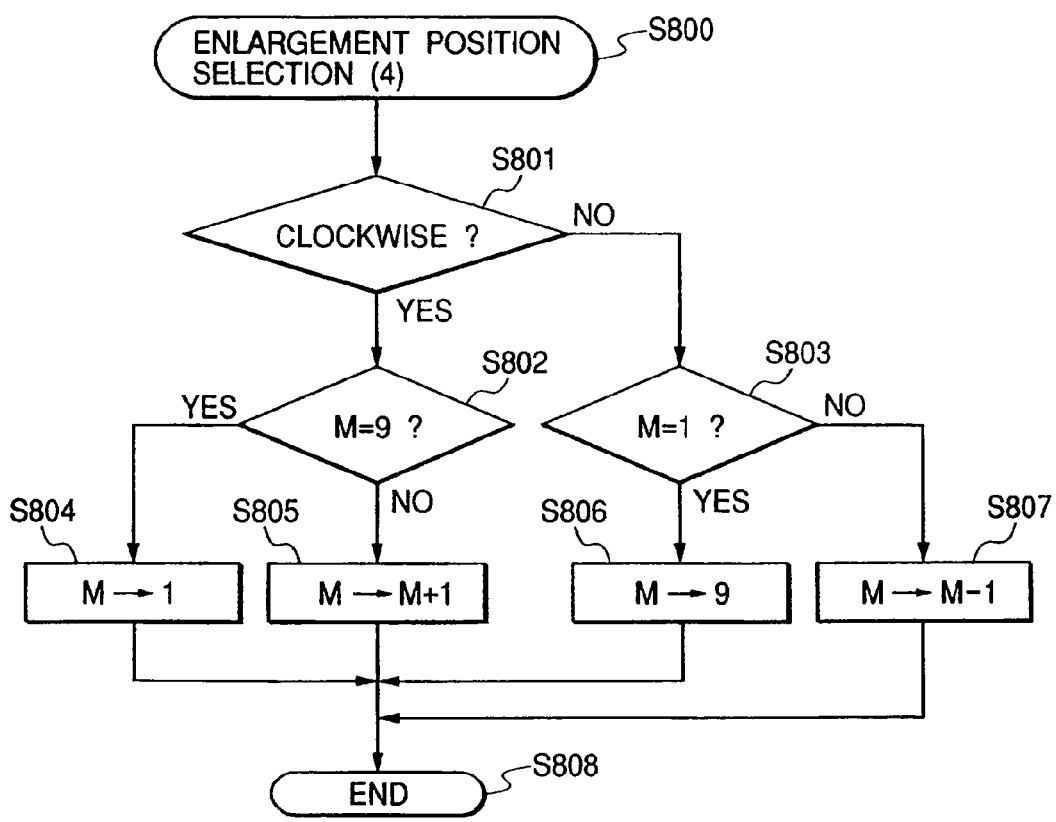
FIG. 14 is a flow chart showing enlargement position selecting operation during the enlargement reproduction in the third embodiment of the invention.

When the enlargement position selecting operation in the flow chart shown in FIG. 14 is performed in Step S711, the operation proceeds to Step S702, and the enlargement area corresponding to the selecting sequence information M is extracted according to the attitude information to display the enlargement image on the LCD monitor 16.

In the case where the electronic dial switch 12 is not depressed in Step S710, the operation proceeds to Step S712, and it is decided whether the end of the enlargement reproduction is set by the mode setting switch (not shown) or not. In the case where the end of the enlargement reproduction is not set, the operation proceeds to Step S710. In the case where the end of the enlargement reproduction is selected in Step S712, the operation proceeds to Step S713, and the enlargement reproduction operation is ended.

As described above, in the position selecting operation in the enlargement reproduction mode, the sequence of selecting the image data area is changed to the direction opposite to the direction of rotating the camera. Consequently, in the case of the widthwise image, each one click in the clockwise direction of the electronic dial switch 12 selects the area in order of P5→P6→P7→P8→P9→P1→P2→P3→P4→ . . . . In the case of the lengthwise image in which the release switch 17 is located on the lower side, each one click in the clockwise direction of the electronic dial switch 12 selects the area in order of P5→P2→P9→P6→P3→P7→P4→P1→P8 . . . . In the case of the lengthwise image in which the release switch 17 is located on the upper side, each one click in the clockwise direction of the electronic dial switch 12 selects the area in order of P5→P8→P1→P4→P7→P3→P6→P9→P2→ . . . . In any attitude on the LCO monitor 16, the area is moved to the right side in the row direction by the clockwise click of the electronic dial switch 12, and the area is moved to the left end of the lower row next to the right end in the row direction. Then, the area is moved to the left end of the uppermost row next to the right end of the lowermost row. Accordingly, the operating ease for the user can be also realized irrespective of the photographing attitude.

Although the case in which the magnification is three times is shown in the embodiment, the invention can be also applied to an arbitrary magnification and an arbitrary enlargement area.

According to the first and second embodiments of the invention, in performing the frame feeding of the enlargement reproduction mode in the electronic still camera, when the attitude information in taking the photograph is changed, the enlargement area is moved to the initial position previously set or the predetermined position determined by the calculation. Further, when the attitude information in taking the photograph is not changed, the enlargement area is maintained. Accordingly, the details of the photographed image can be continuously confirmed, and the natural operation feeling for the user can be realized even if the change in the photographing attitude occurs.

According to the third embodiment of the invention, the operational ease for the user can be also realized irrespective of the photographing attitude in such a manner that the order of selecting the area of the image data is changed according to the attitude information in the position selecting operation in the enlargement reproduction mode.

Needless to say, the object of the invention is also achieved, in such a manner that the storage medium in which program code of software realizing the function of the above embodiments is recorded is supplied to the system or the apparatus and a computer (or CPU or MPU) in the system or the apparatus reads out and executes the program code stored in the storage medium.

In this case, the function of the above embodiments is realized by the program code itself read out from the storage medium, and the program code itself and the storage medium storing the program code constitute the invention.

A flexible disk, a hard disk, an optical disk, a magneto-optical disk, CD-ROM, CD-R, magnetic tape, a nonvolatile memory card, ROM, and the like can be used as the storage medium for supplying the program code.

Needless to say, the invention includes not only the case in which the function of the above embodiment is realized by executing the program code read out by the computer, but also the case in which OS (basic system or operating system) which is running on the computer or the like performs a part of the actual processing or the whole actual processing on the basis of instructions of the program code and the function of the above embodiment is realized by the processing.

Needless to say, the invention includes the case in which, after the program code read out from the storage medium is written in a memory which is incorporated in a function enhancement board inserted in the computer or a function enhancement unit connected to the computer, CPU included in the function enhancement board or the function enhancement unit or the like performs a part of the actual processing or the whole actual processing on the basis of instructions of the program code and the function of the above embodiment is realized by the processing.

According to the embodiment, the enlargement target areas of the image data are properly changed according to the detection result of the attitude state of the reproducing apparatus, and the rotational displays of the enlargement target areas are performed, so that convenience can be improved in the enlargement reproduction of the image data.

As described above, although the invention was described by the preferred embodiment, the invention is not limited to the above embodiments, but various modifications can be made without departing from the spirit and the scope of the invention.

What is claimed is:
1. A display apparatus comprising:
a setting unit configured to set position information of a display subject area in image data obtained by an image pickup unit;

an image processing unit configured to extract a partial area of the image data on the basis of the position information set by the setting unit;

a display control unit configured to control to display the partial area of the image data extracted by the image processing unit;

a change-over unit configured to change over a partial area which is the display subject area, to a partial area of other image data; and determination unit configured to determine whether there is a change in each of attitude information related to the image data before change-over by the change-over unit and attitude information related to the other image data, wherein if the determination unit determines that there is not a change, the image processing unit extracts the partial area of the other image data on the basis of the position information set to the image data before the change-over by the setting unit.

2. A display apparatus according to claim 1, further comprising a rotation processing unit configured to perform rotation processing on the partial area of the image data extracted by the image processing unit, on the basis of the attitude information, wherein the display control unit displays the partial area rotated by the rotation processing unit.

3. A display apparatus according to claim 1, wherein if the determination unit determines that there is a change, the image processing unit extracts the partial area of the other image data which is a display subject area, on the basis of position information different from the position information set to the image data before the change-over by the setting unit.

4. A display apparatus according to claim 3, wherein the position information different from the position information set to the image data before the change-over by the setting unit is an initial position set in advance.

5. A display apparatus according to claim 3, wherein the position information different from the position information set to the image data before the change-over by the setting unit is position information calculated as position information corresponding to the position information set to the image data before the change-over.

6. A display apparatus according to claim 5, wherein the position information different from the position information set to the image data before the change-over by the setting unit is calculated such that a predetermined position coordinates of the partial area of the image data before the change-over and a predetermined position coordinates of the display subject area of the other image data onto which the attitude information is reflected correspond relatively to each other.

7. A control method of a display apparatus comprising:

a setting step of setting position information of a display subject area in image data obtained by an image pickup unit;

an image processing step of extracting a partial area of the image data on the basis of the position information set in the setting step;

a display control step of controlling to display the partial area of the image data extracted in the image processing step;

a change-over step of changing over a partial area which is the display subject area, to a partial area of other image data; and a determination step of determining whether there is a change in each of attitude information related to the image data before change-over by the change-over unit and attitude information related to the other image data, wherein if the determination step determines that there is not a change, the image processing step extracts the partial area of the other image data on the basis of the position information set to the image data before the change-over in the setting step.

8. A non-transitory computer-readable storage medium storing a program for causing a computer to execute the steps including:

a setting step of setting position information of a display subject area in image data obtained by an image pickup unit;

an image processing step of extracting a partial area of the image data on the basis of the position information set in the setting step;

a display control step of controlling to display the partial area of the image data extracted in the image processing step;

a change-over step of changing over a partial area which is the display subject area, to a partial area of other image data; and a determination step of determining whether there is a change in each of attitude information related to the image data before change-over by the change-over unit and attitude information related to the other image data, wherein if the determination step determines that there is not a change, the image processing step extracts the partial area of the other image data on the basis of the position information set to the image data before the change-over in the setting step.

* * * * *